UNITED STATES PATENT OFFICE.

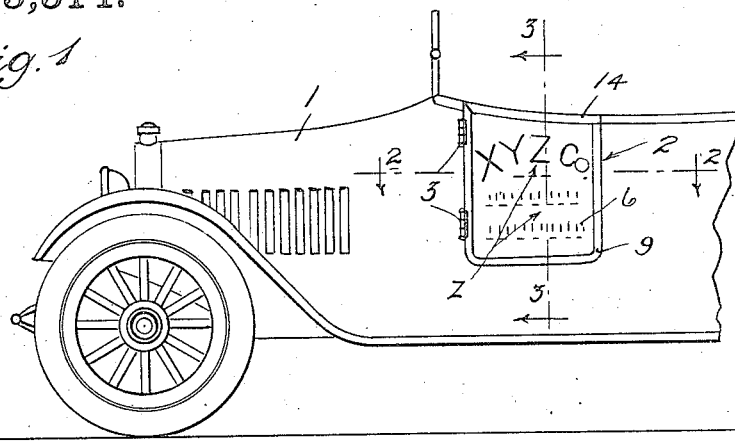
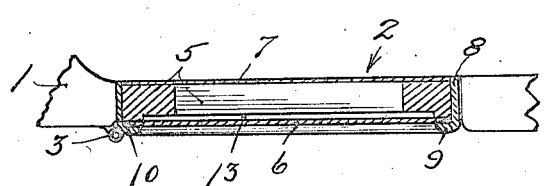
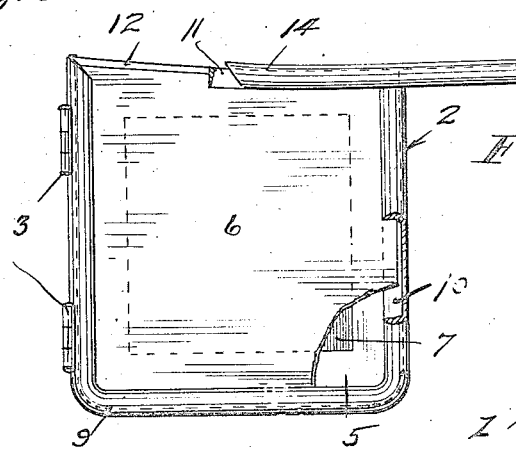
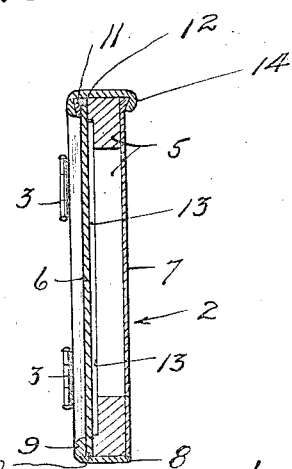
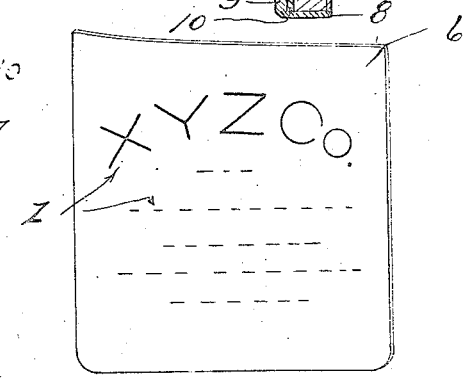
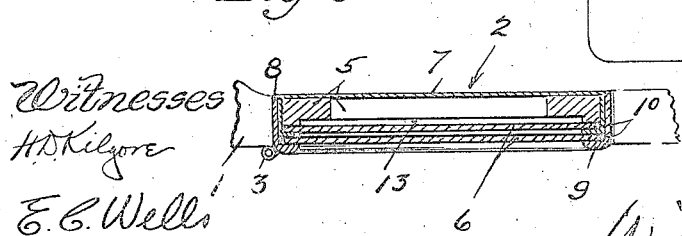

NILS JUELL, OF MINNEAPOLIS, MINNESOTA.

AUTOMOBILE-DOOR.

1,295,514. Specification of Letters Patent. Patented Feb. 25, 1919.

Application filed July 17, 1916. Serial No. 109,827.

*To all whom it may concern:*

Be it known that I, NILS JUELL, a citizen of the United States, residing at Minneapolis, in the county of Hennepin and State of Minnesota, have invented certain new and useful Improvements in Automobile-Doors; and I do hereby declare the following to be a full, clear, and exact description of the invention, such as will enable others skilled in the art to which it appertains to make and use the same.

My invention relates to improvements in automobile doors and has for its object to provide such doors with interchangeable panel faces, whereby one side of a panel may be painted like the body of the automobile or have any other desired finish and the other side thereof may have printed thereon a name, character or an advertisement.

To the above end, the invention consists of the novel devices and combinations of devices hereinafter described and defined in the claims.

In the accompanying drawings, which illustrate the invention, like characters indicate like parts throughout the several views.

Referring to the drawings,

Figure 1 is a fragmentary side elevation of the front end portion of an automobile having the invention incorporated therein;

Fig. 2 is a horizontal section taken on the line 2—2— of Fig. 1, on an enlarged scale;

Fig. 3 is a vertical section taken on the line 3—3— of Fig. 1, on an enlarged scale;

Fig. 4 is a front elevation of one of the doors removed from the automobile and illustrated on an enlarged scale, with some parts broken away, some parts sectioned and with the slide partly removed;

Fig. 5 is a perspective view of one of the door panels; and

Fig. 6 is a view corresponding to Fig. 2, but illustrating a slight modification.

The automobile in which the invention is incorporated is indicated as an entirety by the numeral 1, with the exception of the doors 2, which are connected thereto by hinges 3. As the doors on the opposite sides of the automobile may be alike, the description of the one will suffice for the other. Each door 2 comprises a rectangular frame 5, a removable outer panel 6 and an inner panel 7 rigidly secured to the frame 5. The vertical and bottom edge portions of the door 2 are covered by a U-shape metal facing 8, having on its outer edge a laterally inturned flange or bead 9, which is spaced apart from the frame 5 to afford a U-shape groove 10. This groove 10 is adapted to detachably hold the front panel 6.

The upper ends of the U-shape flange 9 are connected by a horizontal bar 11 spaced apart from the frame 5 to afford a slot 12, which is vertically alined with the groove 10. The panel 6 is inserted into the groove 10 or removed therefrom through the slot 12. When the panel 6 is seated in the groove 10, the upper horizontal edge portion thereof is located within the slot 12. The outer face of the frame 5 is recessed at 13, so that the panel 6 will not come in contact therewith and thereby scratch or mar the same.

A channel slide 14 is provided for covering the top of the door 2, bar 11 and slot 12 and thereby give the door a finished appearance and also to hold the panel 6 against lifting movement in the groove 10 and slot 12. The flanges of this slide 14 have dovetail interlocking engagement with the upper horizontal edge portion of the panel 7 and the bar 11, as best shown in Fig. 3. The slide 14 is moved endwise into position from the front edge of the door and engages the upper end of the flange 9 as a stop. Preferably, the slide 14 will be held in position by frictional contact with the panel 7 and bar 11, but if desirable, a pin or other suitable means may be provided for securing the same to the frame 5 against endwise movement.

The expression "interchangeable panel faces" is intended to include a single panel that can be reversed face for face, two panels that can be interchangeably held in a door, one at a time, panels that can be shifted from one door to the other on opposite sides of an automobile to change their exposed faces and two panels held in a door, the one in front of the other, as shown in Fig. 6.

In Figs. 1 to 5, inclusive, the construction is such that the panels 6 may be shifted from one door to the other on opposite sides of an automobile to either expose the advertising contained thereon or cover the same up, or, if desired, two panels for each door may be provided, one panel having a plain outer face and the other having on its outer face an advertisement. In case the doors of the automobile are of symmetrical form, the advertisement on the panel may be exposed or covered up simply by reversing the panel in the door.

The construction shown in Fig. 6 is identical with the construction shown in the other figures, with the exception that two U-shape grooves 10 are formed in the door, one directly back of the other, so that two interchangeable panels may be carried by each door, the one having a plain outer face and the other having on its outer face an advertisement.

Automobile doors, constructed in accordance with the above described invention, are especially intended for automobiles used for both business and pleasure. When used in business, the panel face containing the name of the firm or other advertisement may be exposed and when used as a pleasure car, the plain side of the panel face may be exposed.

What I claim is:—

1. An automobile door comprising a marginal frame and inner and outer panels with a recess therebetween, said outer panel being reversible face for face.

2. An automobile having doors comprising marginal frames and inner and outer panels with recesses therebetween, said outer panels being detachable and interchangeable to reverse their exposed faces.

3. An automobile door having in its outer face a U-shape groove, a panel removably held in said groove, and a slide covering the top of the door and the upper edge portion of the panel.

In testimony whereof I affix my signature in presence of two witnesses.

NILS JUELL.

Witnesses:
D. H. LLUFTON,
W. W. HOOKUND.